(12) United States Patent
Nagata et al.

(10) Patent No.: US 10,871,200 B2
(45) Date of Patent: Dec. 22, 2020

(54) TRANSMISSION DEVICE

(71) Applicant: AISIN AW CO., LTD., Anjo (JP)

(72) Inventors: Masaki Nagata, Anjo (JP); Yusuke Suzuki, Nagoya (JP); Keisuke Suzuki, Okazaki (JP); Yuji Ueno, Chiryu (JP); Takashi Ando, Okazaki (JP); Takeshi Kimura, Okazaki (JP)

(73) Assignee: AISIN AW CO., LTD., Anjo (JP)

( * ) Notice: Subject to any disclaimer, the term of this patent is extended or adjusted under 35 U.S.C. 154(b) by 120 days.

(21) Appl. No.: 16/089,119

(22) PCT Filed: Jun. 7, 2017

(86) PCT No.: PCT/JP2017/021187
§ 371 (c)(1),
(2) Date: Sep. 27, 2018

(87) PCT Pub. No.: WO2017/213190
PCT Pub. Date: Dec. 14, 2017

(65) Prior Publication Data
US 2019/0107175 A1   Apr. 11, 2019

(30) Foreign Application Priority Data
Jun. 7, 2016 (JP) .................. 2016-113727

(51) Int. Cl.
*F16H 1/06* (2006.01)
*F16H 37/06* (2006.01)
(Continued)

(52) U.S. Cl.
CPC ............ *F16H 1/06* (2013.01); *F16H 37/021* (2013.01); *F16H 37/06* (2013.01); *F16H 57/0025* (2013.01)

(58) Field of Classification Search
CPC .......... F16H 1/06; F16H 37/021; F16H 37/06; F16H 57/0025
(Continued)

(56) References Cited

U.S. PATENT DOCUMENTS 4,433,594 A * 2/1984 Smirl ................... F16D 13/64
192/113.34
4,489,621 A * 12/1984 McIntosh ............... F16H 3/385
192/48.612
(Continued)

FOREIGN PATENT DOCUMENTS

JP   H04-337146 A   11/1992
JP   2015-215065 A   12/2015

OTHER PUBLICATIONS

Aug. 22, 2017 International Search Report issued in International Patent Application No. PCT/JP2017/021187.

*Primary Examiner* — Bobby Rushing, Jr.
(74) *Attorney, Agent, or Firm* — Oliff PLC

(57) ABSTRACT

A transmission device that includes a first shaft, a second shaft to which torque is transmitted from the first shaft via a torque transmitting mechanism, a tubular drive gear attached to the second shaft, and a driven gear that meshes with the drive gear, wherein the drive gear includes a plurality of outer teeth that are each meshed with a corresponding one of gear teeth of the driven gear and a fitting portion that is formed on an inner peripheral surface of the drive gear and that is fitted to the second shaft so that the drive gear rotates integrally with the second shaft.

8 Claims, 3 Drawing Sheets

(51) Int. Cl.
*F16H 37/02* (2006.01)
*F16H 57/00* (2012.01)
(58) Field of Classification Search
USPC .................................................... 74/665 G
See application file for complete search history.

(56) References Cited

U.S. PATENT DOCUMENTS

| | | | | |
|---|---|---|---|---|
| 4,539,866 | A * | 9/1985 | Koivunen | F16H 37/021 |
| | | | | 475/204 |
| 4,754,659 | A * | 7/1988 | Rietsch | F16H 3/093 |
| | | | | 464/160 |
| 5,052,990 | A * | 10/1991 | Sakakibara | F16H 37/021 |
| | | | | 474/29 |
| 5,715,901 | A * | 2/1998 | Tokushima | F16H 1/06 |
| | | | | 180/65.6 |
| 2015/0204434 | A1* | 7/2015 | Wiens | F16H 57/027 |
| | | | | 74/606 R |
| 2016/0348777 | A1* | 12/2016 | Khanzode | F16H 57/027 |
| | | | | 74/606 R |

* cited by examiner

TRANSMISSION DEVICE

BACKGROUND

The disclosure relates to transmission devices including a first shaft and a second shaft to which torque from the first shaft is transmitted via a torque transmitting mechanism.

Conventionally, a belt-type continuously variable transmission including a primary shaft (first shaft) that has a primary pulley, a secondary shaft (second shaft) that has a secondary pulley, and a transmission belt that is wrapped around the primary pulley and the secondary pulley, is known as a transmission installed in a vehicle (for example, see Japanese Patent Application Publication No. 2015-215065). In the continuously variable transmission, both ends of the secondary shaft are each supported by a bearing supported by a housing, to be rotatable around a second shaft center. A tubular drive gear that constitutes a reduction gear device is attached to the secondary shaft.

SUMMARY

Recently, the need for lowering fuel consumption of vehicles is increasing, and to achieve this, there is a demand for further downsizing of transmission devices. In order to downsize the transmission device, it is considered to further reduce a distance between the secondary pulley and the drive gear of the continuously variable transmission as described above to shorten the secondary shaft and thus make the entire device more compact. However, in this case, the dynamic rigidity of the secondary shaft is increased due to the shortening of the secondary shaft, which leads to an increase in vibration force (mesh force) caused by meshing of the drive gear and the driven gear. Thus, there is a possibility of an increase in gear noise generated between the drive gear and the driven gear. In order to reduce the gear noise, the mass of the secondary shaft needs to be increased or the rigidity of a case of the continuously variable transmission needs to be increased. However, if the mass of the secondary shaft is increased or the rigidity of the case is increased, it becomes difficult to make the entire device more compact and lightweight.

An exemplary aspect of the disclosure makes a transmission device more compact and lightweight, and reduce gear noise generated by meshing of a drive gear and a driven gear attached to a second shaft of the transmission device.

The transmission device of the disclosure is a transmission device including a first shaft, a second shaft to which torque is transmitted from the first shaft via a torque transmitting mechanism, a tubular drive gear attached to the second shaft, and a driven gear that meshes with the drive gear, in which the drive gear includes a plurality of outer teeth that are each meshed with a corresponding one of gear teeth of the driven gear and a fitting portion that is formed on an inner peripheral surface of the drive gear and that is fitted to the second shaft so that the drive gear rotates integrally with the second shaft, and an area of the fitting portion, which extends from at least a central portion in an axial direction of the drive gear to an end portion on an opposite side of the fitting portion from the outer teeth, does not overlap with the outer teeth in the axial direction when viewed in a radial direction of the drive gear, the fitting portion is spaced further away from the torque transmitting mechanism in the axial direction than the outer teeth, and torque transmitted from the first shaft to the second shaft via the torque transmitting mechanism is transmitted from the second shaft to the outer teeth via the fitting portion of the drive gear.

In the transmission device, torque transmitted from the first shaft to the second shaft via the torque transmitting mechanism is transmitted from the second shaft to the fitting portion of the drive gear, and torque transmitted to the drive gear is transmitted to the outer teeth spaced in the axial direction away from the fitting portion on the inner peripheral side. It is thus possible to suppress an increase in the axial length of the secondary shaft while extending the torque transmission path from the torque transmitting mechanism to the outer teeth of the drive gear, and substantially lower the rigidity of the members from the torque transmitting mechanism to the outer teeth of the drive gear. Thus, dynamic rigidity of the meshing portion of the drive gear and the driven gear can be reduced to reduce gear noise generated by meshing of the two gears. Therefore, it is possible to suppress the increase in rigidity of the transmission device case, that is, the increase in the weight of the transmission device case. As a result, in the transmission device, the entire device can be made more compact and lightweight, and gear noise generated by meshing of the drive gear and the driven gear attached to the second shaft can be reduced.

DETAILED DESCRIPTION OF EMBODIMENTS

Modes for carrying out the disclosure of the disclosure will be described below with reference to the drawings.

Figure 1:
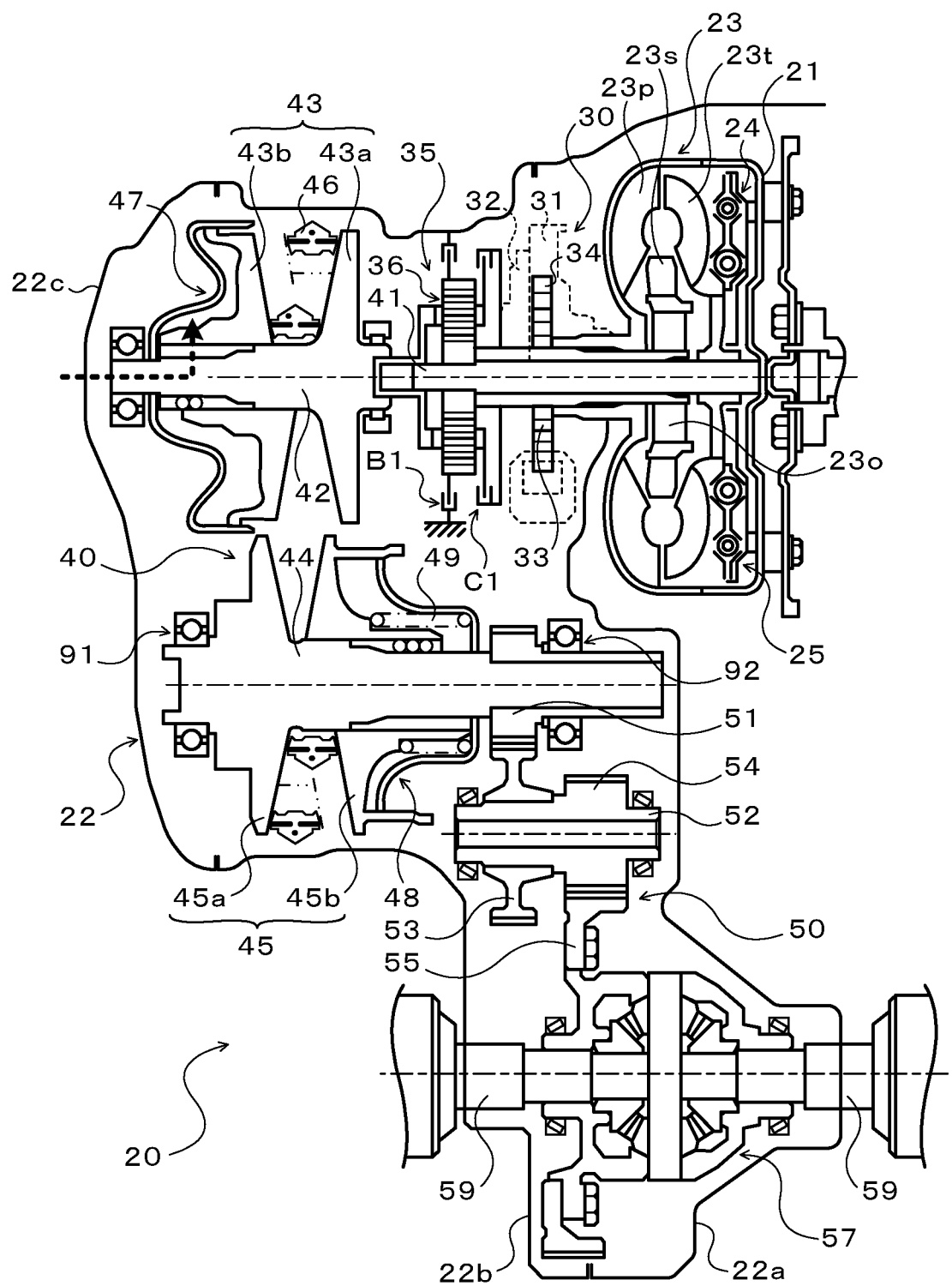
FIG. 1 is a schematic configuration diagram of a power transmission device including a transmission device of the disclosure.

FIG. 1 is a schematic configuration diagram of a power transmission device 20 including a continuously variable transmission (hereinafter referred to as appropriate as "CVT") 40 serving as a transmission device of the disclosure. The power transmission device 20 shown in the figure is installed in a front wheel drive vehicle and is a transaxle that is coupled to an engine disposed transversely so that a crankshaft and left and right drive shafts 59, which are connected to driving wheels not shown, are generally parallel to each other. As shown in the figure, in addition to the CVT 40, the power transmission device 20 includes: a transmission case 22 composed of a housing (first case) 22a, a transaxle case (second case) 22b, and a rear case (third case) 22c integrally joined to each other; and a starting device 23, an oil pump 30, a forward/reverse switching mechanism 35, a gear mechanism 50, and a differential gear (differential mechanism) 57 that are housed in the transmission case 22 with the CVT 40 etc.

The starting device 23 is configured as a fluid-type starting device with a lock-up clutch, and is housed in the housing 22a. As shown in FIG. 1, the starting device 23 has a pump impeller 23p connected to the crankshaft of the engine via a front cover 21 that serves as an input member, a turbine runner 23t fixed to an input shaft 41 of the CVT 40, a stator 23s disposed inside the pump impeller 23p and the turbine runner 23t to adjust the flow of working oil (ATF) from the turbine runner 23t to the pump impeller 23p, a one-way clutch 23o that restricts rotation of the stator 23s to one direction, a damper mechanism 24, and a lock-up clutch 25 etc.

The pump impeller 23p, the turbine runner 23t, and the stator 23s function as a torque converter through the action of the stator 23s when the rotational speed difference between the pump impeller 23p and the turbine runner 23t is large, and function as a fluid coupling when a rotational speed difference between the pump impeller 23p and the turbine runner 23t is small. However, the starting device 23 may not be provided with the stator 23s and the one-way clutch 23o so that the pump impeller 23p and the turbine runner 23t function only as a fluid coupling. The damper mechanism 24 has an input element coupled to the lock-up clutch 25, an intermediate element coupled to the input element via a plurality of first elastic members, and an output element coupled to the intermediate element via a plurality of second elastic members and fixed to a turbine hub etc. The lock-up clutch 25 selectively establishes and releases lock-up in which the pump impeller 23p and the turbine runner 23t, that is, the front cover 21 and the input shaft 41 of the CVT 40, are mechanically coupled to each other (via the damper mechanism 24). The lock-up clutch 25 may be configured as a hydraulic single-plate friction clutch, or may be constituted as a hydraulic multi-plate friction clutch.

The oil pump 30 is configured as a so-called gear pump that has a pump assembly composed of a pump body 31 and a pump cover 32 disposed between the starting device 23 and the forward/reverse switching mechanism 35, an inner rotor (externally toothed gear) 33, and an outer rotor (internally toothed gear) 34 etc. The pump body 31 and the pump cover 32 are fixed to the housing 22a or the transaxle case 22b. The inner rotor 33 is coupled to the pump impeller 23p via a hub. Thus, when the inner rotor 33 is rotated by power from the engine, the oil pump 30 suctions working oil (ATF) in an oil pan (working oil storage portion) not shown via a strainer (not shown), and supplies (discharges) the working oil, the pressure of which has been raised, to a hydraulic control device not shown.

The forward/reverse switching mechanism 35 is housed inside the transaxle case 22b, and has a double-pinion planetary gear mechanism 36, and a brake B1 and a clutch C1 that serve as hydraulic friction engagement elements. The planetary gear mechanism 36 has a sun gear fixed to the input shaft 41 of the CVT 40, a ring gear, and a carrier that supports a pinion gear meshed with the sun gear and a pinion gear that meshes with the ring gear and that is coupled to a primary shaft 42 of the CVT 40. The brake B1 disengages the ring gear of the planetary gear mechanism 36 from the transaxle case 22b so as to be rotatable, and makes the ring gear of the planetary gear mechanism 36 unrotatably fixed to the transaxle case 22b when a hydraulic pressure is supplied from the hydraulic control device. The clutch C1 disengages the carrier of the planetary gear mechanism 36 from the input shaft 41 (sun gear) so as to be rotatable, and couples the carrier of the planetary gear mechanism 36 to the input shaft 41 when a hydraulic pressure is supplied from the hydraulic control device.

Consequently, by disengaging the brake B1 and engaging the clutch C1, it is possible to transmit power transmitted to the input shaft 41 as it is to the primary shaft 42 of the CVT 40 to drive the vehicle forward. By engaging the brake B1 and disengaging the clutch C1, it is possible to transfer rotation of the input shaft 41 to the primary shaft 42 of the CVT 40 with the direction of the rotation inverted, to drive the vehicle rearward. By disengaging the brake B1 and the clutch C1, it is possible to release connection between the input shaft 41 and the primary shaft 42.

The CVT 40 has: a primary pulley 43 provided on the primary shaft (first shaft) 42 which serves as a driving rotary shaft; a secondary pulley 45 provided on a secondary shaft (second shaft) 44 that serves as a driven rotary shaft disposed in parallel with the primary shaft 42; a transmission belt 46 that extends between a pulley groove of the primary pulley 43 and a pulley groove of the secondary pulley 45; a primary cylinder 47 which is a hydraulic actuator that changes the width of the groove of the primary pulley 43; and a secondary cylinder 48 which is a hydraulic actuator that changes the width of the groove of the secondary pulley 45. The primary pulley 43 includes a fixed sheave 43a formed integrally with the primary shaft 42, and a movable sheave 43b supported by the primary shaft 42 via a ball spline so as to be slidable in an axial direction. The secondary pulley 45 includes a fixed sheave 45a formed integrally with the secondary shaft 44, and a movable sheave 45b supported by the secondary shaft 44 via a ball spline so as to be slidable in the axial direction and urged in the axial direction by a return spring 49 which is a compression spring.

The primary cylinder 47 is formed behind the movable sheave 43b of the primary pulley 43. The secondary cylinder 48 is formed behind the movable sheave 45b of the secondary pulley 45. Working oil is supplied from the hydraulic control device to the primary cylinder 47 and the secondary cylinder 48 in order to change the width of the grooves of the primary pulley 43 and the secondary pulley 45. This allows power transmitted from the engine to the primary shaft 42 via the starting device 23 and the forward/reverse switching mechanism 35 to be continuously varied in speed and the resultant power to be output to the secondary shaft 44. The power output to the secondary shaft 44 is then transmitted to the left and right driving wheels via the gear mechanism 50, the differential gear 57, and the drive shafts.

The gear mechanism 50 has: a counter drive gear 51 that rotates integrally with the secondary shaft 44; a counter shaft (third shaft) 52 that extends in parallel with the secondary shaft 44 and the drive shafts 59 and that is rotatably supported by the transmission case 22 via a bearing; a counter driven gear 53 fixed to the counter shaft 52 and meshed with the counter drive gear 51; a drive pinion gear (final drive gear) 54 integrally formed with the counter shaft 52 or fixed to the counter shaft 52; and a differential ring gear (final driven gear) 55 meshed with the drive pinion gear 54 and coupled to the differential gear 57.

Figure 2:
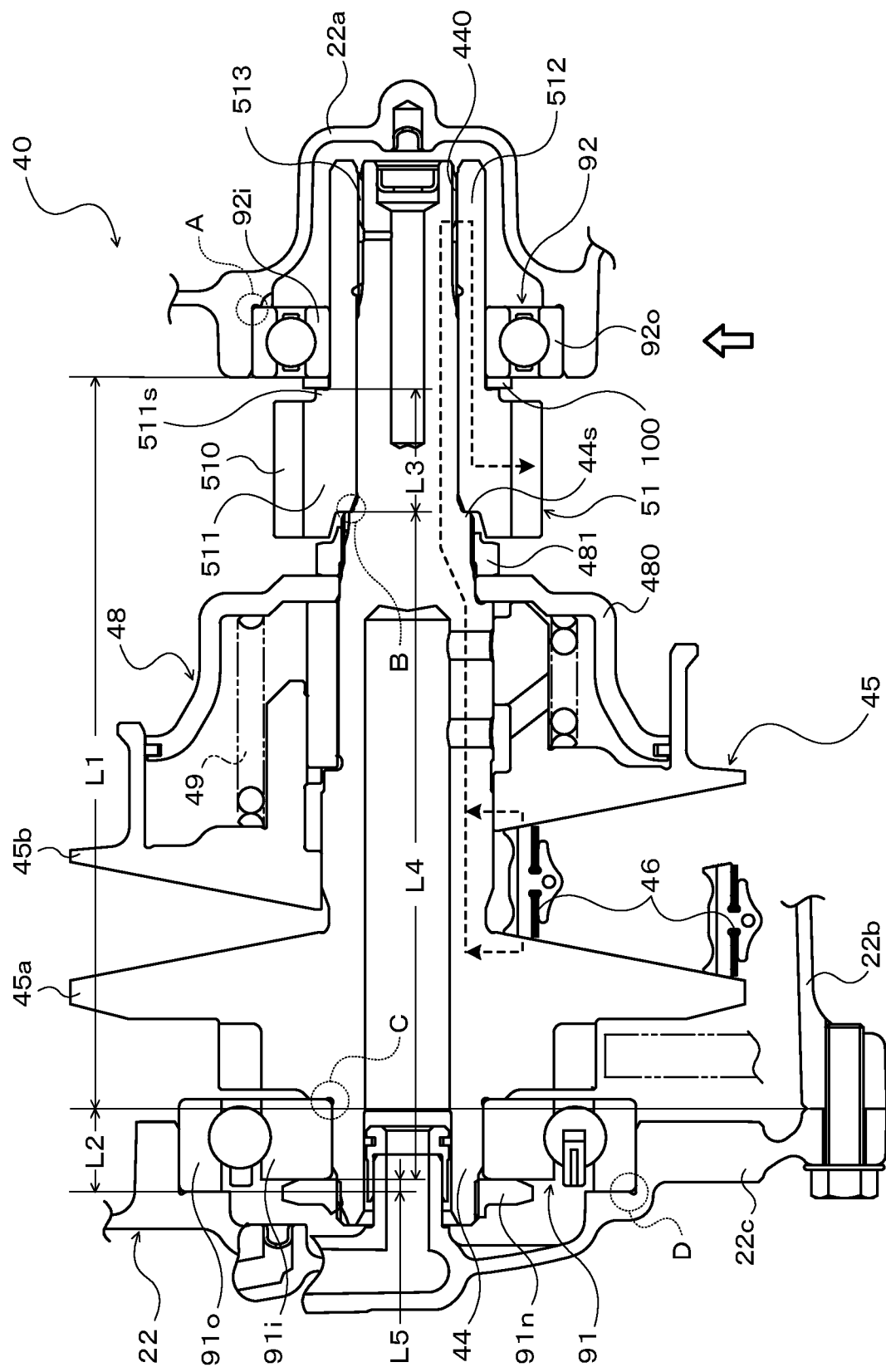
FIG. 2 is an enlarged view of a main portion of the transmission device of the disclosure.

FIG. 2 is an enlarged view of a main portion of the CVT 40. As shown in the figure, the counter drive gear 51 has a hollow tubular shape, and has a large diameter tubular portion 511 including a plurality of outer teeth 510 that are each meshed with a corresponding one of gear teeth of the counter driven gear 53 (see FIG. 1) and a small diameter tubular portion 512 that extends from the large diameter tubular portion 511 in the axial direction and that has a smaller diameter than the large diameter tubular portion 511 (root circle of outer teeth 510). A fitting spline 513 is formed on an inner peripheral surface of the small diameter tubular portion 512 so as to be spaced away from the outer teeth 510 in the axial direction. In the embodiment, the fitting spline 513 is formed on an inner peripheral surface of an end portion on the opposite side of the small diameter tubular portion 512 from the large diameter tubular portion 511 (end portion on the right side of FIG. 2), so that the entire fitting spline 513 does not overlap with the outer teeth 510 in the axial direction when viewed in the radial direction of the counter drive gear 51 (when seen in a direction of a hollow block arrow in FIG. 2).

The fitting spline 513 is fitted to a spline 440 formed on an outer peripheral surface of the secondary shaft 44, with a clearance in a circumferential direction. The fitting spline 513 functions as a fitting portion that is fitted to the secondary shaft 44 so that the counter drive gear 51 rotates integrally with the secondary shaft 44. As shown in FIG. 2, the spline 440 is formed on an end portion on the opposite side of the secondary shaft 44 from the secondary pulley 45. Thus, the counter drive gear 51 is fitted to the secondary shaft 44 so that the fitting spline 513 (and the spline 440) is spaced further away from the primary pulley 43, the secondary pulley 45, and the transmission belt 46 serving as the torque transmitting mechanism in the axial direction than the outer teeth 510. A portion of an inner peripheral surface of the counter drive gear 51, which is nearer to the large diameter tubular portion 511 than the fitting spline 513, is fitted to the secondary shaft 44 like a spigot joint.

An end face of the large diameter tubular portion 511 (one end portion) of the counter drive gear 51 fitted to the secondary shaft 44 abuts against a step portion (expansion portion) 44s formed on the secondary shaft 44. In the embodiment, as shown in FIG. 2, the counter drive gear 51 has a recessed portion for suppressing interference with a nut 481 for fixing a cylinder member 480 that constitutes the secondary cylinder 48 to the secondary shaft 44, and the end face of the large diameter tubular portion 511 that abuts against the step portion 44s is positioned in the recessed portion. When the counter drive gear 51 is attached to the secondary shaft 44, the outer teeth 510 (large diameter tubular portion 511) are nearer to the secondary pulley 45 (torque transmitting mechanism) than the small diameter tubular portion 512, as shown in FIG. 2. Thus, the counter driven gear 53 is fixed to the counter shaft 52 so as to be nearer to the secondary pulley 45 (torque transmitting mechanism) than the drive pinion gear 54 in the axial direction (see FIG. 1). This can shorten the axial length of the CVT 40 and therefore the power transmission device 20.

As shown in the figure, an end portion of the secondary shaft 44 on the secondary pulley 45 side is rotatably supported by a first bearing 91 supported by the rear case 22c of the transmission case 22. The counter drive gear 51 fitted to the secondary shaft 44 is positioned on the opposite side of the secondary pulley 45 from the first bearing 91, and is rotatably supported by a second bearing 92 supported by the housing 22a of the transmission case 22. In this way, by supporting the secondary shaft 44 and the counter drive gear 51 with a pair of the first and second bearings 91, 92, the CVT 40 and therefore, the entire power transmission device 20 can be made more compact compared to when the end portion of the secondary shaft on the secondary pulley side is supported by a single bearing and two ends of the counter drive gear attached to the secondary shaft are supported by two bearings supported by a case.

In the embodiment, the first bearing 91 is a ball bearing that includes an inner race 91i and an outer race 91o. The inner race 91i of the first bearing 91 is press fitted to the end portion of the secondary shaft 44 on the secondary pulley 45 side and is held by a nut 91n screwed on an end portion of the secondary shaft 44 and the fixed sheave 45a. The outer race 910 is held by the rear case 22c. The second bearing 92 is also a ball bearing that includes an inner race 92i and an outer race 92o. The inner race 92i of the second bearing 92 is positioned on a portion of the small diameter tubular portion 512 near the outer teeth 510, so as to not abut against the outer teeth 510 and not to overlap with the fitting spline 513 of the counter drive gear 51 in the axial direction. The outer race 92o has the same axial length as the inner race 92i and is press fitted to a recessed portion formed in the housing 22a. That is, the second bearing 92 supports a part of the small diameter tubular portion 512 which is spaced further away from the secondary pulley 45 than the outer teeth 510, so as not to abut against the outer teeth 510 and not to overlap with the fitting spline 513 in the axial direction. At least one of the first and second bearings 91, 92 may be a tapered roller bearing or a cylindrical roller bearing.

As described above, in the CVT 40, the counter drive gear 51 is fitted to the secondary shaft 44 so that the large diameter tubular portion 511 (one end portion) abuts against the step portion 44s of the secondary shaft 44 and rotates integrally with the secondary shaft 44. The first bearing 91 is supported by the rear case 22c of the transmission case 22 and supports the end portion of the shaft 44 on the secondary pulley 45 side. The second bearing 92 is supported by the housing 22a of the transmission case 22 and supports the counter drive gear 51 that is fitted to the secondary shaft 44 on the opposite side of secondary pulley 45 from the first bearing 91. Thus, when the axial displacement of either one of the secondary shaft 44 or the counter drive gear 51 is regulated between the first bearing 91 and the second bearing 92, the axial displacement of the other can also be regulated.

Thus, in the CVT 40, a single shim member (selected shim) 100 having an annular shape formed by a thin metal plate is disposed between the inner race 92i of the second bearing 92 and the large diameter tubular portion 511 of the counter drive gear 51 so as to not abut against the outer teeth 510. In the embodiment, a contact portion 511s is formed on the end portion of the large diameter tubular portion 511 of the counter drive gear 51 on the small diameter tubular portion 512 side, in which the contact portion 511s has a diameter that is smaller than the root circle of the outer teeth 510 and larger than the diameter of the small diameter tubular portion 512. The shim member 100 is disposed between an end face of the contact portion 511s and an end face of the inner race 92i so as to abut against them.

Thus, in the CVT 40, the axial displacement of the secondary shaft 44 and the counter drive gear 51 to the transmission case 22 can be regulated by the single shim member 100 disposed around the secondary shaft 44. Therefore, inclination of the transmission belt 46 (axial displacement of the transmission belt 46) can be suppressed and the axial displacement of the counter drive gear 51 can be regulated. As a result, it is possible to suppress deterioration of torque transmission efficiency via the transmission belt 46 and the counter drive gear 51 and deterioration of durability of the transmission belt 46 and the counter drive gear 51. In the CVT 40, the axial displacement of the transmission belt 46 and the counter drive gear 51 can be regulated with only the single shim member 100. Thus, it is possible to reduce the number of assembly processes and assembly parts of the CVT 40 and suppress an increase in cost.

In the CVT 40 configured as above, torque is transmitted from the primary shaft 42 to the secondary shaft 44 via the primary pulley 43, the transmission belt 46, and the secondary pulley 45 serving as the torque transmitting mechanism. As shown by a broken line in FIG. 2, torque transmitted to the secondary shaft 44 is transmitted from the secondary shaft 44 to the fitting spline 513 of the counter drive gear 51 via the spline 440. The torque transmitted to the counter drive gear 51 is transmitted to the outer teeth 510 that are spaced in the axial direction away from the fitting spline 513 on the inner peripheral side.

In this way, it is possible to suppress an increase in the axial length of the secondary shaft 44 while extending a torque transmission path from the secondary pulley 45 (torque transmitting mechanism) to the outer teeth 510 of the counter drive gear 51, and substantially lower rigidity (torsional rigidity) of members from the secondary pulley 45 to the outer teeth 510 of the counter drive gear 51. Thus, dynamic rigidity of a meshing portion of the counter drive gear 51 and the counter driven gear 53 can be reduced to reduce gear noise generated by meshing of the two gears. Therefore, it is possible to suppress an increase in rigidity of the transmission case 22, that is, an increase in the weight of the transmission case 22. As a result, in the power transmission device 20 including the CVT 40, the entire device can be made more compact and lightweight, and gear noise generated by meshing of the counter drive gear 51 and the counter driven gear 53 attached to the secondary shaft 44 can be reduced.

In the CVT 40 described above, the fitting spline 513 of the counter drive gear 51 is formed on the inner peripheral surface of the counter drive gear 51 (small diameter tubular portion 512), so that the entire fitting spline 513 does not overlap with the outer teeth 510 in the axial direction when viewed in the radial direction. Thus, it is possible to increase the length of the torque transmission path from the secondary pulley 45 to the outer teeth 510 of the counter drive gear 51. However, if an area of the fitting spline 513, which extends from at least a central portion in the axial direction to the end portion on the opposite side of the fitting spline 513 from the outer teeth 510, does not overlap with the outer teeth 510 in the axial direction when viewed in the radial direction of the counter drive gear 51, it is possible to sufficiently ensure the torque transmission path from the secondary pulley 45 to the outer teeth 510 of the counter drive gear 51. Thus, depending on the axial length of the secondary shaft 44 and the counter drive gear 51, the end portion of the fitting spline 513 on the secondary pulley 45 side may overlap with the outer teeth 510 in the axial direction when viewed in the radial direction.

In the CVT 40, the second bearing 92 is disposed between the outer teeth 510 and the fitting spline 513, so as not to overlap with the two in the axial direction. Thus, the secondary shaft 44 is supported with high accuracy by the second bearing 92, and the second bearing 92 receives moment to suppress the moment from acting on the fitting spline 513 and the spline 440. Therefore, it is possible to satisfactorily reduce the rigidity of the members from the secondary pulley 45 to the outer teeth 510 of the counter drive gear 51. In the CVT 40, there is no need to provide a portion on the secondary shaft 44, which is only supported by the second bearing 92 and that does not contribute to the transmission of torque, as is the case when the second bearing 92 is disposed so as to be spaced further away from the secondary pulley 45 in the axial direction than the fitting spline 513. Thus, it is possible to shorten the secondary shaft 44 and reduce the size of the entire device.

In the embodiment described above, the fitting portion of the counter drive gear 51 is the fitting spline 513 that is fitted to the spline 440 formed on the outer peripheral surface of the secondary shaft 44 with the clearance in the circumferential direction. Thus, it is possible to suppress the increase in rigidity (torsional rigidity) of the members from the secondary pulley 45 (torque transmitting mechanism) to the outer teeth 510 of the counter drive gear 51, as well as cause the secondary shaft 44 and the counter drive gear 51 to rotate integrally. By providing the fitting spline 513 on the small diameter tubular portion 512 of the counter drive gear 51, it is possible to satisfactorily decrease the rigidity of the members from the secondary pulley 45 (torque transmitting mechanism) to the outer teeth 510 of the counter drive gear 51. By supporting the portion of the small diameter tubular portion 512, which is near the outer teeth 510 with the second bearing 92, it is possible to suppress an increase of an interval between the first and second bearings 91, 92 and reduce bending moment applied to the small diameter tubular portion 512 of the counter drive gear 51. Additionally, the second bearing 92 supports the small diameter tubular portion 512, so as not to abut against the outer teeth 510 and not to overlap with the small diameter tubular portion 512. Thus, even if looseness occurs near the fitting spline 513 of the counter drive gear 51, it is possible to reduce the effects of looseness on the second bearing 92.

The structure described above, for extending the torque transmission path from the secondary pulley 45 (torque transmitting mechanism) to the outer teeth 510 of the counter drive gear 51 may be applied to a transmission device other than the CVT 40. That is, the structure described above may be applied to a stepped transmission or a hybrid transmission having first and second shafts disposed parallel to each other, or a transmission device that includes a main transmission having the first shaft and a sub transmission having the second shaft. In these cases, the torque transmitting mechanism that transmits torque between the first shaft and the second shaft may be a gear mechanism (gear train) or a wrapping transfer mechanism that includes a belt or a chain.

An assembling procedure of the shim member 100 of the power transmission device 20 will be described. In the embodiment, when the power transmission device 20 is being assembled, the shim member 100 is assembled to the second bearing 92 with the counter drive gear 51, after various components including the second bearing 92 are assembled in the housing 22a and the transaxle case 22b is fastened to the housing 22a.

Specifically, the shim member 100 is temporarily fixed near the corresponding contact portion 511s of the counter drive gear 51 through grease. The small diameter tubular portion 512 of the counter drive gear 51 is inserted in the inner race 92i of the second bearing 92 so that the shim member 100 abuts against the end face of the contact portion 511s and the end face of the inner race 92i. After the counter drive gear 51 and the shim member 100 are assembled to the inner race 92i of the second bearing 92 in this way, the secondary shaft 44 included in an assembled CVT assembly is fitted to the counter drive gear 51. Thus, it is possible to easily dispose the shim member 100 between the inner race 92i of the second bearing 92 and the contact portion 511s of the counter drive gear 51.

When assembling the power transmission device 20, a plurality of the shim members 100 differing in thickness is provided and distances L1, L2, L3, L4 and L5 in FIG. 2 are measured in a predetermined step. The distance L1 is the distance between the end face of the inner race 92i of the second bearing 92 assembled to the housing 22a and an end face of the transaxle case 22b fastened to the housing 22a. The distance L2 is the distance between the end face of the transaxle case 22b fastened to the housing 22a and an end face of the outer race 910 of the first bearing 91 assembled to the secondary shaft 44 that is assembled to the housing 22a and in the transaxle case 22b. The distance L3 is the distance between the end face of the contact portion 511s of the counter drive gear 51 and an end face of the counter drive gear 51 that abuts against the step portion 44s of the secondary shaft 44. The distance L4 is the distance between an end face of the step portion 44s of the secondary shaft 44 and an end face of the inner race 91i of the first bearing 91 assembled to the secondary shaft 44 (end face on the nut 91n side). The distance L5 is the difference between an axial length of the inner race 91i and an axial length of the outer race 910 of the first bearing 91. After the distances L1 to L5 are measured, an interval d=L1+L2−(L3+L4+L5) is calculated. Then, the shim member 100 having a thickness that coincides with the interval d or that is closest to the interval d is selected. The selected shim member 100 is then temporarily fixed to the corresponding counter drive gear 51 through grease. Thus, it is possible to keep the axial displacement of the secondary shaft 44 and the counter drive gear 51 to the transmission case 22 within a prescribed very small range. If the axial length of the inner race 91i coincides with the axial length of the outer race 910 of the first bearing 91, there is no need to measure the distance L5.

In the power transmission device 20, the shim member 100 is disposed between the inner race 92i of the second bearing 92 and the large diameter tubular portion 511 (contact portion 511s) of the counter drive gear 51. However, the shim member 100 is not limited to this. That is, the shim member 100 may be disposed between the housing 22a of the transmission case 22 and the outer race 910 of the second bearing 92 (portion A in FIG. 2). The shim member 100 may also be disposed between the counter drive gear 51 (end face of the large diameter tubular portion 511) and the step portion 44s of the secondary shaft (portion B in FIG. 2). Additionally, the shim member 100 may be disposed between the secondary shaft 44 (end face of the fixed sheave 45a) and the inner race 91i of the first bearing 91 (portion C in FIG. 2). The shim member 100 may also be disposed between the outer race 910 of the first bearing 91 and the rear case 22c of the transmission case 22 (portion D in FIG. 2).

Figure 3:
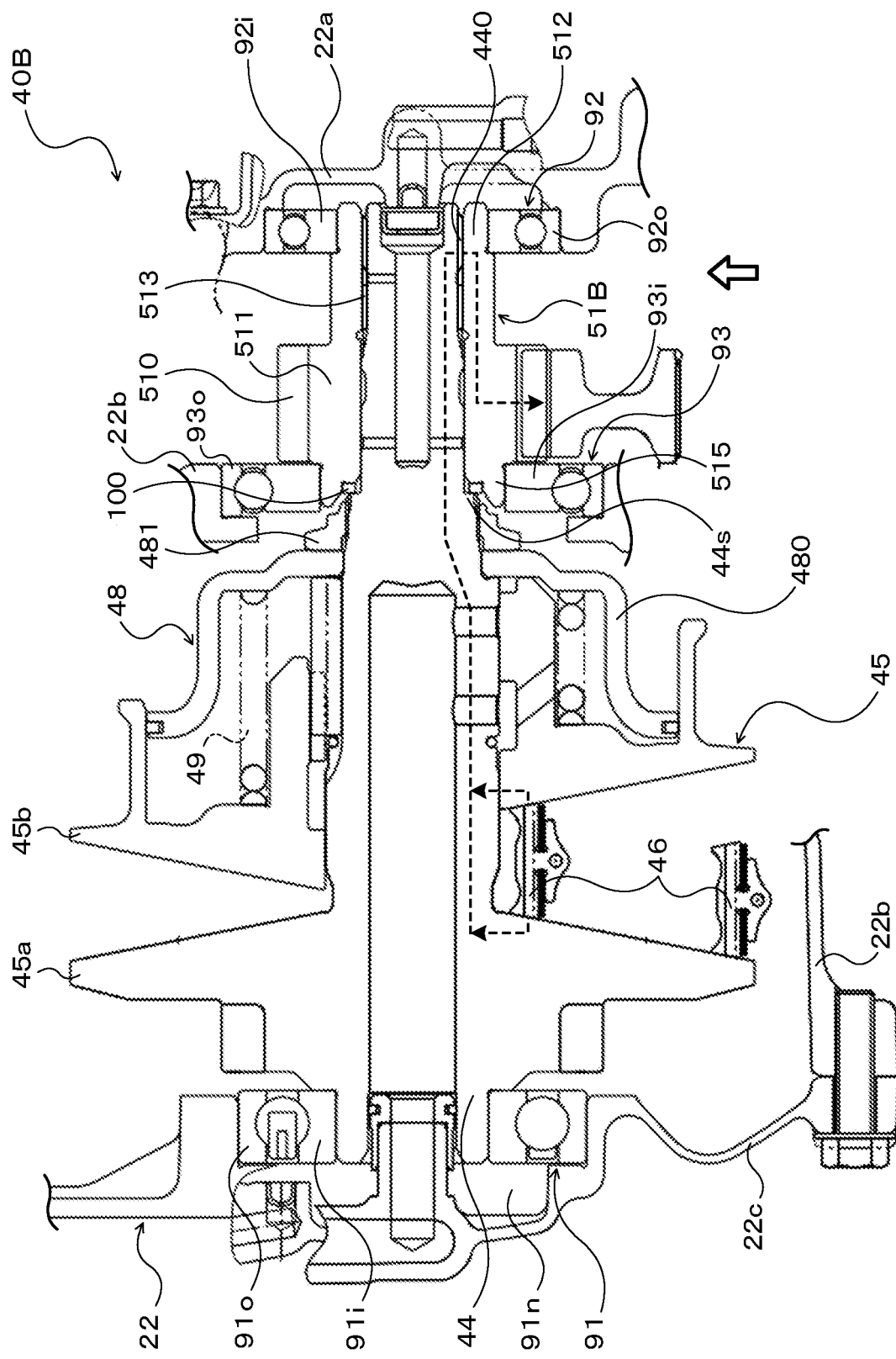
FIG. 3 is an enlarged view of a main portion of a transmission device according to a modified form.

FIG. 3 is an enlarged view of a main portion of a transmission device CVT 40B according to a modified form. Constituent elements that are the same as those of the CVT 40 described above are given the same reference signs and description thereof will be omitted.

In the CVT 40B in FIG. 3, a counter drive gear 51B includes, in addition to the large diameter tubular portion 511 having the outer teeth 510 and the small diameter tubular portion 512 having the fitting spline 513, a supported portion 515 that extends from the large diameter tubular portion 511 in a direction away from the small diameter tubular portion 512 and that has a smaller diameter than the large diameter tubular portion 511. The fitting spline 513 of the counter drive gear 51B is fitted to the spline 440 of the secondary shaft 44 so that the supported portion 515 is nearer to the secondary pulley 45 than the outer teeth 510. An inner peripheral surface of an end portion of the supported portion 515 is formed so that its diameter gradually increases as it is spaced away from the outer teeth 510. The end portion of the supported portion 515 surrounds an end portion of the nut 481 for fixing the cylinder member 480 to the secondary shaft 44. The shim member 100 is disposed between the supported portion 515 and the step portion (expansion portion) 44s formed on the secondary shaft 44 so as to abut against the two.

The fitting spline 513 of the counter drive gear 51B is also fitted to the spline 440 of the secondary shaft 44 with the clearance in the circumferential direction. The fitting spline 513 of the counter drive gear 51B is formed on the inner peripheral surface of the small diameter tubular portion 512, so that the entire fitting spline 513 does not overlap with the outer teeth 510 in the axial direction when viewed in the radial direction of the counter drive gear 51B (when viewed in a direction of a hollow block arrow in FIG. 3). Thus, it is possible to suppress the increase in rigidity of the members from the primary pulley 45 to the outer teeth 510 of the counter drive gear 51B, as well as increase the length of the torque transmission path from the secondary pulley 45 to the outer teeth 510 of the counter drive gear 51B. By providing the fitting spline 513 on the small diameter tubular portion 512 of the counter drive gear 51B, it is possible to satisfactorily decrease the rigidity of the members from the secondary pulley 45 to the outer teeth 510 of the counter drive gear 51B.

However, also in the CVT 40B, if the area of the fitting spline 513, which extends from at least a central portion in the axial direction to the end portion on the opposite side of the fitting spline 513 from the outer teeth 510, does not overlap with the outer teeth 510 in the axial direction when viewed in the radial direction of the counter drive gear 51B, it is possible to sufficiently ensure the torque transmission path from the secondary pulley 45 to the outer teeth 510 of the counter drive gear 51B. Thus, depending on the axial length of the secondary shaft 44 and the counter drive gear 51B, the end portion of the fitting spline 513 on the secondary pulley 45 side may overlap with the outer teeth 510 in the axial direction when viewed in the radial direction.

The end portion of the secondary shaft 44 on the secondary pulley 45 side is rotatably supported by the first bearing 91 supported by the rear case 22c of the transmission case 22. Additionally, the counter drive gear 51B fitted to the secondary shaft 44 is positioned on the opposite side of the secondary pulley 45 from the first bearing 91, and a free end portion of the small diameter tubular portion 512 of the counter drive gear 51B is rotatably supported by the second bearing 92 supported by the housing 22a of the transmission case 22.

In addition to the first and second bearings 91, 92, the CVT 40B includes a third bearing 93 disposed on the opposite side of the secondary pulley 45 from the first bearing 91 and nearer to the secondary pulley 45 than the second bearing 92. The third bearing 93 is a ball bearing that includes an inner race 93i and an outer race 93o. The inner race 93i of the third bearing 93 is press fitted in the supported portion 515 of the counter drive gear 51B and the outer race 93o is supported by the transaxle case 22b. That is, the third bearing 93 supports the supported portion 515 nearer to the secondary pulley 45 than the outer teeth 510 of the counter drive gear 51B fitted to the secondary shaft 44, and the secondary shaft 44 is supported by the transmission case 22 at three points through the first, second, and third bearings 91, 92, 93.

In this way, in the CVT 40B, the secondary shaft 44 can be supported through the first, second, and third bearings 91, 92, 93 with high accuracy. Additionally, the second and third bearings 92, 93 receive moment to suppress the moment from acting on the fitting spline 513. Thus, it is possible to satisfactorily decrease the rigidity of the members from the secondary pulley 45 to the outer teeth 510 of the counter drive gear 51B. At least one of the first, second, or third bearings 91, 92, 93 may be a tapered roller bearing or a cylindrical roller bearing.

As described above, the transmission device of the disclosure is the transmission device (40, 40B) including the first shaft (42), the second shaft (44) to which torque is transmitted from the first shaft (42) via the torque transmitting mechanism (43, 45, 46), the tubular drive gear (51, 51B) attached to the second shaft (44), and the driven gear (53) meshed with the drive gear (51, 51B). The drive gear (51, 51B) has the outer teeth (510) that are each meshed with the corresponding one of the gear teeth of the driven gear (53) and the fitting portion (513) that is formed on the inner peripheral surface of the drive gear (51, 51B) and that is fitted to the second shaft (44) so that the drive gear (51, 51B) rotates integrally with the second shaft (44). The area of the fitting portion (513), which extends from at least the central portion in the axial direction of the drive gear (51, 51B) to the end portion on the opposite side of the fitting portion (513) from the outer teeth (510), does not overlap with the outer teeth (510) in the axial direction when viewed in the radial direction of the drive gear (51, 51B). The fitting portion (513) is spaced further away from the torque transmitting mechanism (43, 45, 46) in the axial direction than the outer teeth (510). Torque transmitted from the first shaft (42) to the second shaft (44) via the torque transmitting mechanism (43, 45, 46) is transmitted from the second shaft (44) to the outer teeth (510) via the fitting portion (513) of the drive gear (51, 51B).

In the transmission device of the disclosure, torque transmitted from the first shaft to the second shaft via the torque transmitting mechanism is transmitted from the second shaft to the fitting portion of the drive gear, and torque transmitted to the drive gear is transmitted to the outer teeth spaced in the axial direction away from the fitting portion on the inner peripheral side. It is thus possible to suppress an increase in the axial length of the secondary shaft while extending the torque transmission path from the torque transmitting mechanism to the outer teeth of the drive gear, and substantially lower the rigidity of the members from the torque transmitting mechanism to the outer teeth of the drive gear. Thus, dynamic rigidity of the meshing portion of the drive gear and the driven gear can be reduced to reduce gear noise generated by meshing of the two gears. Therefore, it is possible to suppress the increase in rigidity of the transmission device case, that is, the increase in the weight of the transmission device case. As a result, in the transmission device of the disclosure, the entire device can be made more compact and lightweight, and gear noise generated by meshing of the drive gear and the driven gear attached to the second shaft can be reduced.

The fitting portion (513) of the drive gear (51, 51B) may be formed on the inner peripheral surface of the drive gear (51, 51B), so that the entire fitting portion (513) does not overlap with the outer teeth (510) in the axial direction when viewed in the radial direction. Thus, it is possible to increase the length of the torque transmission path from the torque transmitting mechanism to the outer teeth of the drive gear.

The fitting portion of the drive gear (51, 51B) may be the fitting spline (513) that is fitted to the spline (440) formed on the outer peripheral surface of the second shaft (44), with the clearance in the circumferential direction. Thus, it is possible to suppress the increase in rigidity of the members from the torque transmitting mechanism to the outer teeth of the drive gear, as well as cause the second shaft and the drive gear to rotate integrally.

The transmission device (40) may have the first bearing (91) that supports the end portion of the second shaft (44) on the torque transmitting mechanism (43, 45, 46) side, and the second bearing (92) that is on the opposite side of the torque transmitting mechanism (43, 45, 46) from the first bearing (91) and that supports the portion spaced further away from the torque transmitting mechanism (43, 45, 46) than the outer teeth (510) of the drive gear (51) fitted to the second shaft (44). The fitting portion (513) may be fitted to the second shaft (44) so as to be spaced further away from the torque transmitting mechanism (43, 45 46) in the axial direction than the second bearing (92). The second bearing is disposed between the outer teeth and the fitting portion, so as not to overlap with the two in the axial direction. Thus, the second shaft is supported with high accuracy by the second bearing, and the second bearing receives moment to suppress the moment from acting on the fitting portion. Therefore, it is possible to satisfactorily reduce the rigidity of the members from the torque transmitting mechanism to the outer teeth of the drive gear.

The drive gear (51) may include the large diameter tubular portion (511) having the outer teeth (510) and the small diameter tubular portion (512) that extends from the large diameter tubular portion (511) in the axial direction so as to include the fitting portion (513) and that has a smaller diameter than the large diameter tubular portion (511). The second bearing (92) may support the portion near the outer teeth (510) of the small diameter tubular portion (512). In this way, by providing the fitting portion on the small diameter tubular portion of the drive gear, it is possible to satisfactorily decrease the rigidity of the members from the torque transmitting mechanism to the outer teeth of the drive gear. By supporting the portion near the outer teeth of the small diameter tubular portion with the second bearing, it is possible to suppress the increase of an interval between the first and second bearings, and reduce moment applied to the small diameter tubular portion of the drive gear.

The second bearing (92) may support the small diameter tubular portion (512), so as not to abut against the outer teeth (510) and not to overlap with the fitting portion (513) in the axial direction. Thus, even if looseness occurs near the fitting portion of the drive gear, it is possible to reduce the effects of looseness to the second bearing.

The transmission device (40B) may have: the first bearing (91) that supports the end portion of the second shaft (44) on the torque transmitting mechanism (43, 45, 46) side; the second bearing (92) that is on the opposite side of the torque transmitting mechanism (43, 45, 46) from the first bearing (91), and that supports the portion of the drive gear (51B) fitted to the second shaft (44), which is spaced further away from the torque transmitting mechanism (43, 45, 46) than the outer teeth (510); and the third bearing (93) that is disposed on opposite side of the torque transmitting mechanism (43, 45, 46) from the first bearing (91) and nearer to the torque transmitting mechanism (43, 45, 46) than the second bearing (92), and that supports the portion (515) of the drive gear (51) fitted to the second shaft (44), which is nearer to the torque transmitting mechanism (43, 45, 46) than the outer teeth (510). The fitting portion (513) may be fitted to the second shaft (44) so as to be spaced further away from the torque transmitting mechanism (43, 45, 46) in the axial direction than the third bearing (93). Thus, the second shaft is supported with high accuracy through the first, second, and third bearings and the second and third bearings receive moment to suppress the moment from acting on the fitting portion. Therefore, it is possible to satisfactorily reduce the rigidity of the members from the torque transmitting mechanism to the outer teeth of the drive gear.

The drive gear (51B) may include: the large diameter tubular portion (511) having the outer teeth (510); the small diameter tubular portion (512) that extends from the large diameter tubular portion (511) in the axial direction so as to include the fitting portion (513) and that has a smaller diameter than the large diameter tubular portion (511); and the supported portion (515) that extends from the large diameter tubular portion (511) in the direction away from the small diameter tubular portion (512) and that has a smaller diameter than the large diameter tubular portion (511). The second bearing (92) may support the free end portion of the small diameter tubular portion (512). The third bearing (93) may support the supported portion (515). In such a configuration, by providing the fitting portion on the small diameter tubular portion of the drive gear, it is possible to satisfactorily decrease the rigidity of the members from the torque transmitting mechanism to the outer teeth of the drive gear.

The torque transmitting mechanism may include the primary pulley (43) provided on the first shaft (42), the secondary pulley (45) provided on the second shaft (44), and the transmission belt (46) wrapped around the primary pulley (43) and the secondary pulley (45). However, the torque transmitting mechanism may be a gear mechanism or a wrapping transfer mechanism.

It should be understood that the disclosure of the present disclosure is not limited in any way to the above embodiments, and various modifications can be made within the spirit and scope of the present disclosure. Furthermore, the embodiments described above are merely specific forms of the disclosure described in the "SUMMARY" section, and do not limit the elements of the disclosure described in the "SUMMARY" section.

INDUSTRIAL APPLICABILITY

The disclosure of the disclosure is applicable to the manufacturing industry of transmission devices, etc.

The invention claimed is:

1. A transmission device comprising
a first shaft,
a second shaft to which torque is transmitted from the first shaft via a torque transmitting mechanism,
a tubular drive gear attached to the second shaft,
a driven gear that meshes with the drive gear, wherein
the drive gear includes a plurality of outer teeth that are each meshed with a corresponding one of a plurality of gear teeth of the driven gear and a fitting portion that is formed on an inner peripheral surface of the drive gear and that is fitted to the second shaft so that the drive gear rotates integrally with the second shaft, and
an area of the fitting portion, which extends from at least a central portion in an axial direction of the drive gear to an end portion in the axial direction of the drive gear on an opposite side from the outer teeth, does not overlap with the outer teeth in the axial direction when viewed in a radial direction of the drive gear, the fitting portion is spaced further away from the torque transmitting mechanism in the axial direction than the outer teeth, and torque transmitted from the first shaft to the second shaft via the torque transmitting mechanism is transmitted from the second shaft to the outer teeth via the fitting portion of the drive gear,
a first bearing that supports an end portion of the second shaft on the torque transmitting mechanism side,
a second bearing that is on an opposite side of the torque transmitting mechanism from the first bearing and that supports a first portion of the drive gear fitted to the second shaft, which is spaced further away from the torque transmitting mechanism than the outer teeth, and
a third bearing that is disposed on the opposite side of the torque transmitting mechanism from the first bearing and nearer to the torque transmitting mechanism than the second bearing and that supports a second portion of the drive gear fitted to the second shaft, which is nearer to the torque transmitting mechanism than the outer teeth, wherein:
an inner peripheral surface of the third bearing is disposed radially outside of an outer peripheral surface of the second portion of the drive gear, and
the fitting portion is fitted to the second shaft so as to be spaced further away from the torque transmitting mechanism in the axial direction than the third bearing.

2. The transmission device according to claim 1, wherein the fitting portion of the drive gear is formed on the inner peripheral surface of the drive gear, so that the entire fitting portion does not overlap with the outer teeth in the axial direction when viewed in the radial direction.

3. The transmission device according to claim 1, wherein the fitting portion of the drive gear is a fitting spline fitted to a spline formed on an outer peripheral surface of the second shaft, with a clearance in a circumferential direction.

4. The transmission device according to claim 1, wherein the fitting portion is fitted to the second shaft so as to be spaced further away from the torque transmitting mechanism in the axial direction than the second bearing.

5. The transmission device according to claim 4, wherein the drive gear includes a large diameter tubular portion having the outer teeth and a small diameter tubular portion that extends from the large diameter tubular portion in the axial direction so as to include the fitting portion and that has a smaller diameter than the large diameter tubular portion, and the second bearing supports a portion of the small diameter tubular portion, which is near the outer teeth.

6. The transmission device according to claim 5, wherein the second bearing supports the small diameter tubular portion, so as not to abut against the outer teeth.

7. The transmission device according to claim 1, wherein the drive gear includes a large diameter tubular portion having the outer teeth, a small diameter tubular portion that extends from the large diameter tubular portion in the axial direction so as to include the fitting portion and that has a smaller diameter than the large diameter tubular portion, and a supported portion that extends from the large diameter tubular portion in a direction away from the small diameter tubular portion and that has a smaller diameter than the large diameter tubular portion, the second bearing supports a free end portion of the small diameter tubular portion, and the third bearing supports the supported portion.

8. The transmission device according to claim 1, wherein the torque transmitting mechanism includes a primary pulley provided on the first shaft, a secondary pulley provided on the second shaft, and a transmission belt wrapped around the primary pulley and the secondary pulley.

* * * * *